April 20, 1948.                W. W. JURY                2,440,096
                          EXTENSIBLE SUPPORT
                      Filed June 7, 1945           2 Sheets-Sheet 1
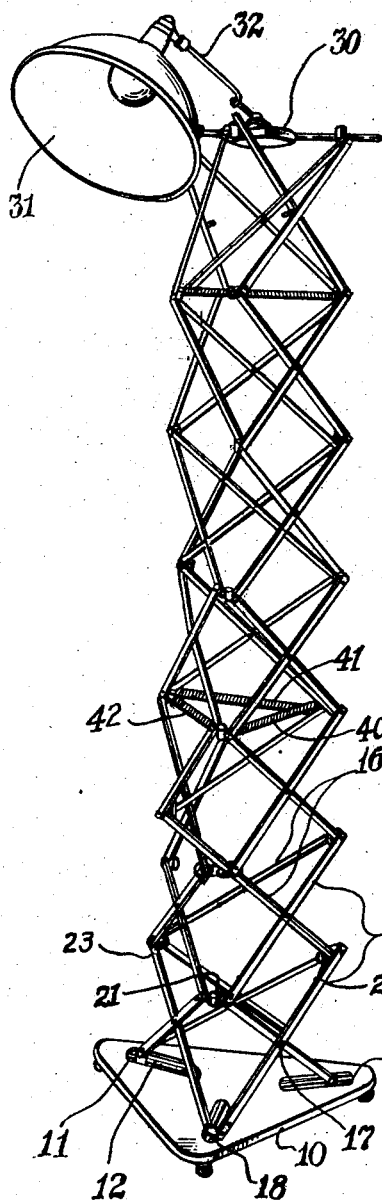
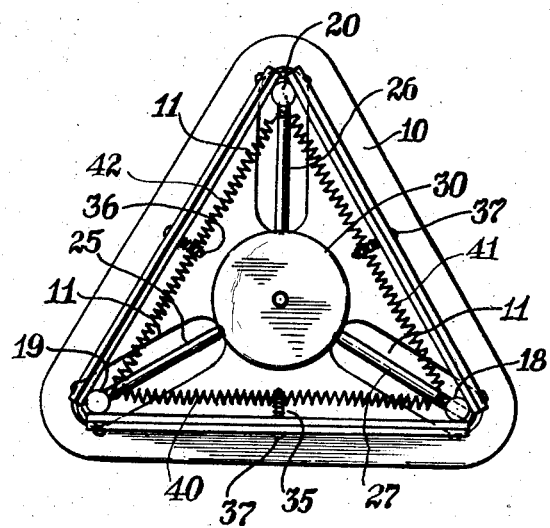
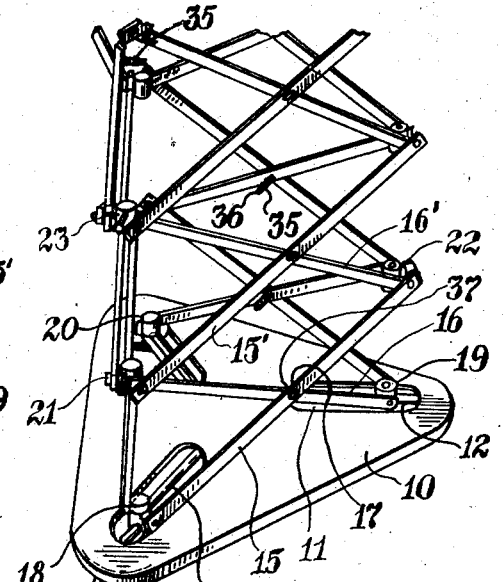
INVENTOR.
Webster W. Jury
BY
Luther W. Hawley
ATTORNEY April 20, 1948.   W. W. JURY   2,440,096
EXTENSIBLE SUPPORT
Filed June 7, 1945   2 Sheets-Sheet 2
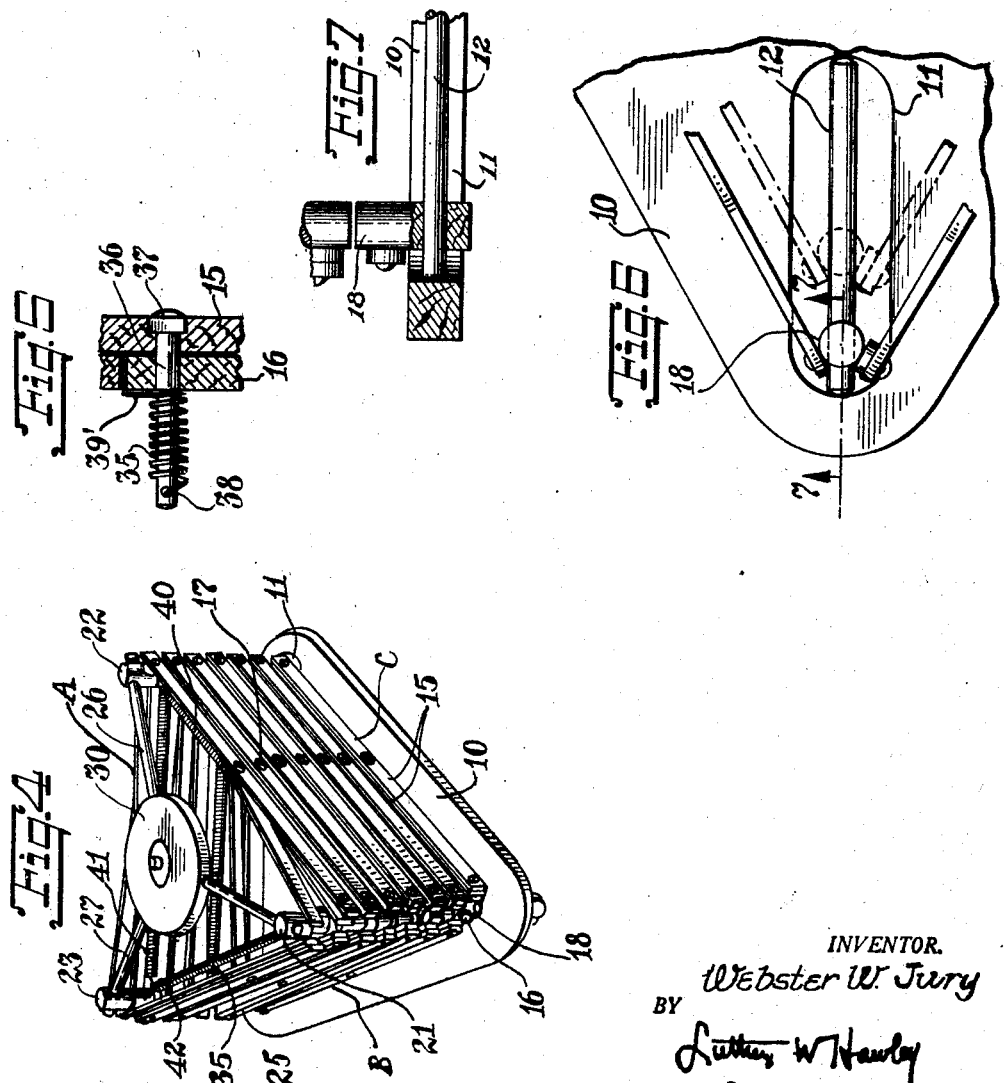
INVENTOR.
Webster W. Jury
BY
Luther W Hawley
ATTORNEY Patented Apr. 20, 1948

2,440,096

UNITED STATES PATENT OFFICE 2,440,096

EXTENSIBLE SUPPORT

Webster W. Jury, Pines Lake, N. J.

Application June 7, 1945, Serial No. 598,127

2 Claims. (Cl. 248—157)

This invention relates to extensible supports or stands adapted for supporting lamps, cameras or any other desired objects.

The invention has for its salient object to provide a simple and practical extensible support so constructed and arranged that it can be easily adjusted to the desired position and will remain in such adjusted position until the adjustment is changed.

Another object of the invention is to provide an extensible support of the character described so constructed and arranged that the weight of the object supported thereon will be compensated for and counterbalanced so that practically no effort will be required to adjust the support to the desired position.

Another object of the invention is to provide an extensible support so constructed and so mounted that the support and object supported thereon will remain in balance in all positions of adjustment thereof.

Further objects of the invention will appear from the following specification taken in connection with the drawings which form a part of this application and in which Fig. 1 is a perspective elevation of an extensible stand or support constructed in accordance with the invention, the support being illustrated in this figure in extended position;

Fig. 2 is a top plan view of the support shown in Fig. 1, the object supported thereon being removed;

Fig. 3 is a perspective elevational view, on a larger scale, showing the connections between the various parts and the manner in which the stand is mounted on the base;

Fig. 4 is a perspective elevational view showing the support in its lowermost position;

Fig. 5 is a detail sectional elevation showing the pivotal connection between the cross arms and the tensioning spring carried thereby;

Fig. 6 is a plan view, broken away, illustrating one corner of the base and the connections of the cross arms thereto; and Fig. 7 is a sectional elevation taken substantially on line 7—7 of Fig. 6, looking in the direction of the arrows.

The invention briefly described consists of three pantagraphs so arranged and so connected as to form a triangular extensible frame or stand. One end of the stand is mounted on a base in such a manner that as the stand is extended and the angles between the cross arms of the pantagraphs are changed, the parts to which the arms are connected at the base can move inwardly on the base. The pantagraph arms are furthermore so connected that the weight of the stand and of the object supported thereby will be automatically compensated for or counterbalanced so that a minimum of effort is required to adjust the triple pantagraph to the desired position.

Further details of the invention will appear from the following description.

In the form of the invention illustrated particularly in Figs. 1 to 7 inclusive, the extensible support comprises a base 10 which, in the form of the invention shown, is triangular and has inwardly extending slots 11 disposed substantially 120° apart and having their axes intersecting at the center of the base. In each of the slots 11 there is mounted a pin or rod 12.

The extensible support comprises three sets of pantagraphs designated on Fig. 4 as A, B and C. Each pantagraph is of the usual construction and comprises cross arms 15 and 16 which are pivoted to each other at 17. The lower ends of the bottom arms 15 and 16, as shown in Fig. 3, are pivoted to corner blocks 18, 19 and 20. These blocks, as shown particularly in Figs. 6 and 7, are slidably mounted on the rods 12.

The other ends of the cross arms 15 and 16 are pivotally connected at their upper ends to the lower ends of another set of cross arms 15' and 16' and are also pivotally connected to blocks 21, 22 and 23.

The foregoing description applies to the cross arms 15 and 16 and 15' and 16' of each of the pantagraph sets A, B and C. Moreover, the remaining cross arms of each pantagraph are similarly pivoted to each other and to the corner blocks 21, 22 and 23.

The corner blocks at the outer ends of the triangularly arranged pivotally mounted pantagraphs are provided with openings and are mounted on rods 25, 26 and 27 similar to the rods 12 at the base and the blocks slide on these rods in a manner similar to the blocks 18, 19 and 20. The rods 25, 26 and 27 are carried by a central disk or supporting member 30 on which is mounted in any suitable manner the object to be supported thereby. For instance, in Fig. 1 there is shown a lamp 31 which is pivotally and adjustably mounted on a bracket 32 carried by the disk 30.

In order to hold the lamp or object in any desired position of adjustment, counterbalancing means are provided. One such means consists of spiral springs 35 which are mounted on bolts 36 which form the pivots 17 of the cross arms, the heads 37 of the bolts being elongated and mounted in an elongated slot in the outer cross arm or arm 15, as shown in Fig. 3. One end of the spring is secured at 38 to the bolt and the other end 39 is fixed to the inner cross arm 16. The spring is wound in such a direction as to cause the arms 15 and 16 to move in a clockwise direction about the pivot 17, or in a direction to cause the ends of the arms to move toward each other and to raise the stand. The spring 35, moreover, holds the arms in frictional engagement with each other, thus creating sufficient friction to hold the pantagraph in the adjusted position.

The pantagraph is also counterbalanced or counterweighted by means of springs 40, 41 and 42 which are connected at their ends to the blocks 21, 22 and 23 and also tend to raise or extend the stand and to hold the parts automatically in adjusted position. The number and tension of the springs 40, 41 and 42 can be regulated to give the desired counterbalancing effect and this statement also applies to the springs 35.

From the foregoing description it will be clear that the triple pantagraph frame construction will firmly and effectively support the object mounted thereon and that the parts will be automatically held in any desired position of adjustment.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. An extensible support comprising three pantagraphs arranged and connected to form a triangle, each pantagraph comprising sets of cross arms pivoted to each other, the outer ends of said arms of each set being pivoted to a common member to which are pivoted the adjacent outer ends of the arms of the next adjacent pantagraph, and a counterbalancing spring mounted on and encircling the pivot of each pair of cross arms and so connected to the pivot and cross arms as to extend said pantagraphs and to hold the cross arms in frictional engagement with each other and hold the pantagraph arms in all positions of adjustment.

2. An extensible support comprising three pantagraphs arranged and connected to form a triangle, each pantagraph comprising sets of cross arms pivoted to each other, the outer ends of said arms of each set being pivoted to a common member to which are pivoted the adjacent outer ends of the arms of the next adjacent pantagraph, counterbalancing means arranged to extend said pantagraphs, and means mounted on and encircling the pivots of said cross arms for holding the pantagraph arms in frictional engagement with each other and in all positions of adjustment.

WEBSTER W. JURY.

REFERENCES CITED

The following references are of record in the file of this patent:

UNITED STATES PATENTS

| Number | Name | Date |
|---|---|---|
| 990,399 | Smith | Apr. 25, 1911 |
| 995,771 | Coyle | June 20, 1911 |
| 1,095,391 | Fogle et al. | May 5, 1914 |
| 1,222,200 | Grandinetti | Apr. 10, 1917 |
| 1,550,944 | Beidler et al. | Aug. 25, 1925 |
| 1,591,791 | Sprout | July 6, 1926 |
| 2,080,441 | Shoop | May 18, 1937 |
| 2,204,301 | Carwardine | June 11, 1940 |

FOREIGN PATENTS

| Number | Country | Date |
|---|---|---|
| 56,793 | Norway | July 6, 1936 |
| 24,078 | Germany | Aug. 13, 1882 |
| 644,009 | France | May 26, 1928 |
| 742,471 | France | Dec. 27, 1932 |